Figure 6:
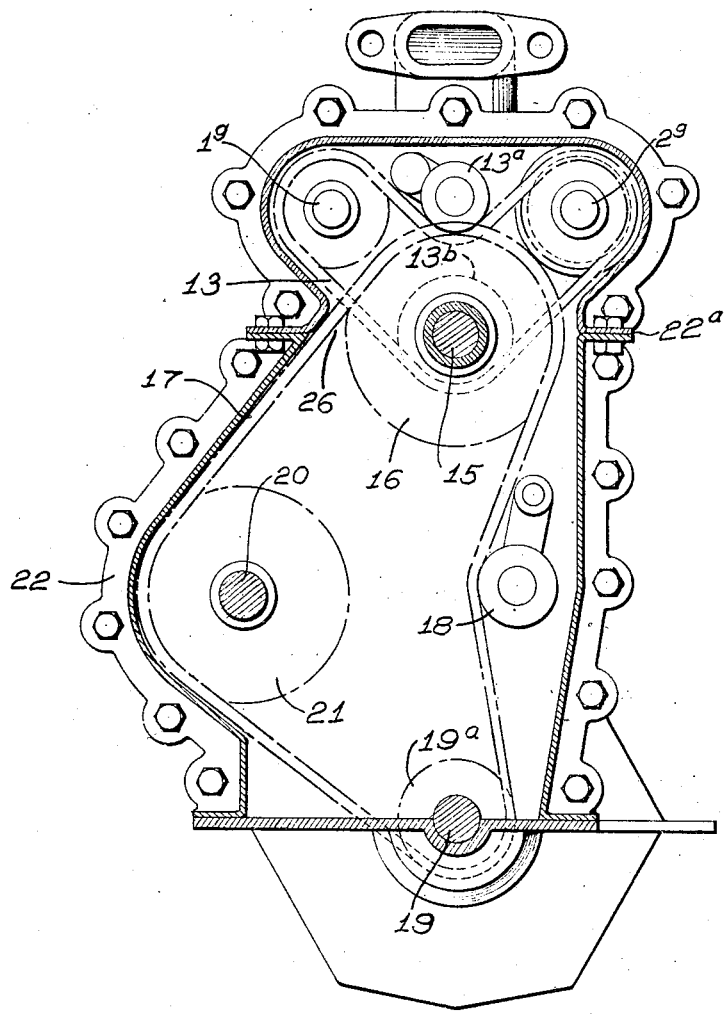

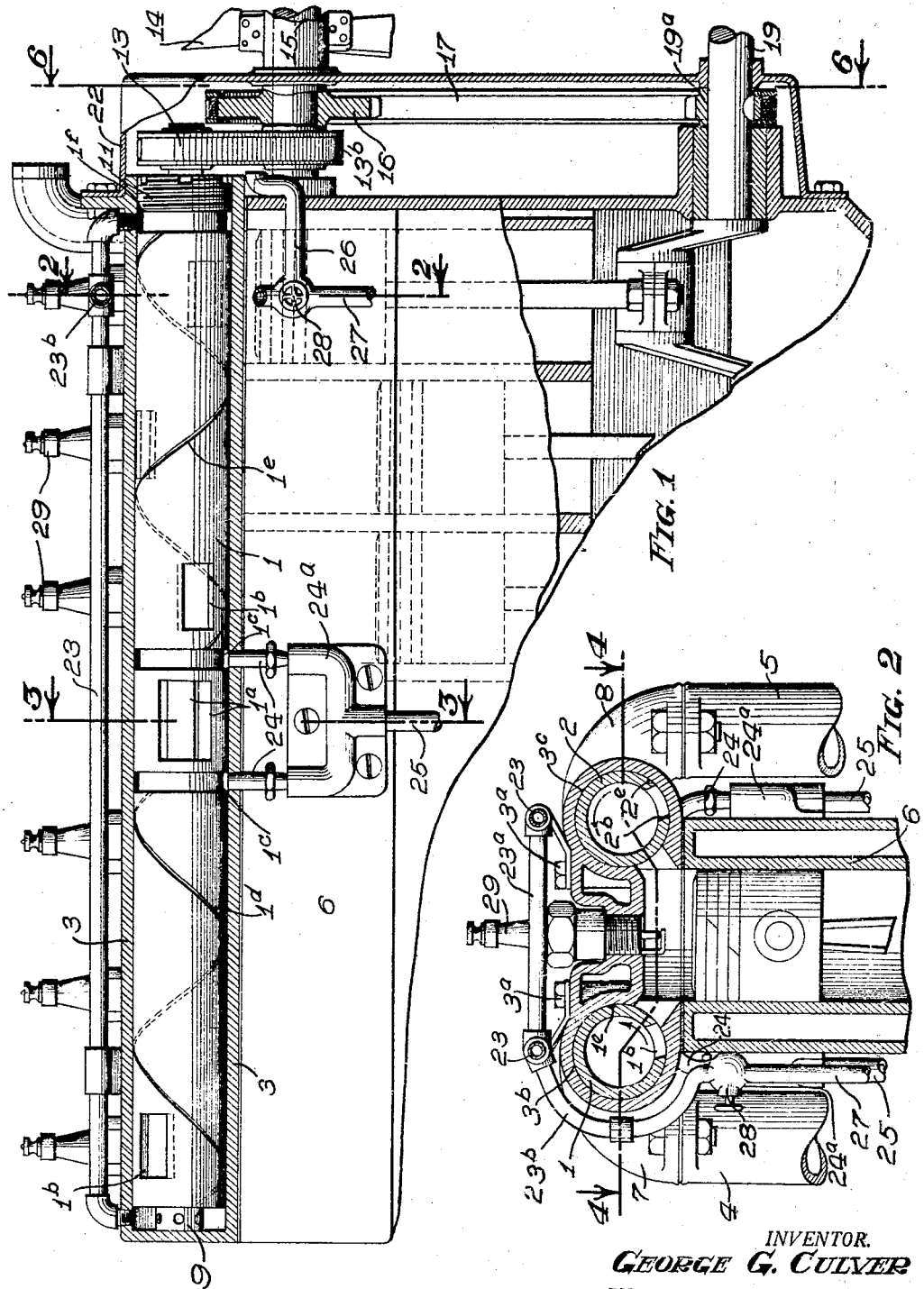

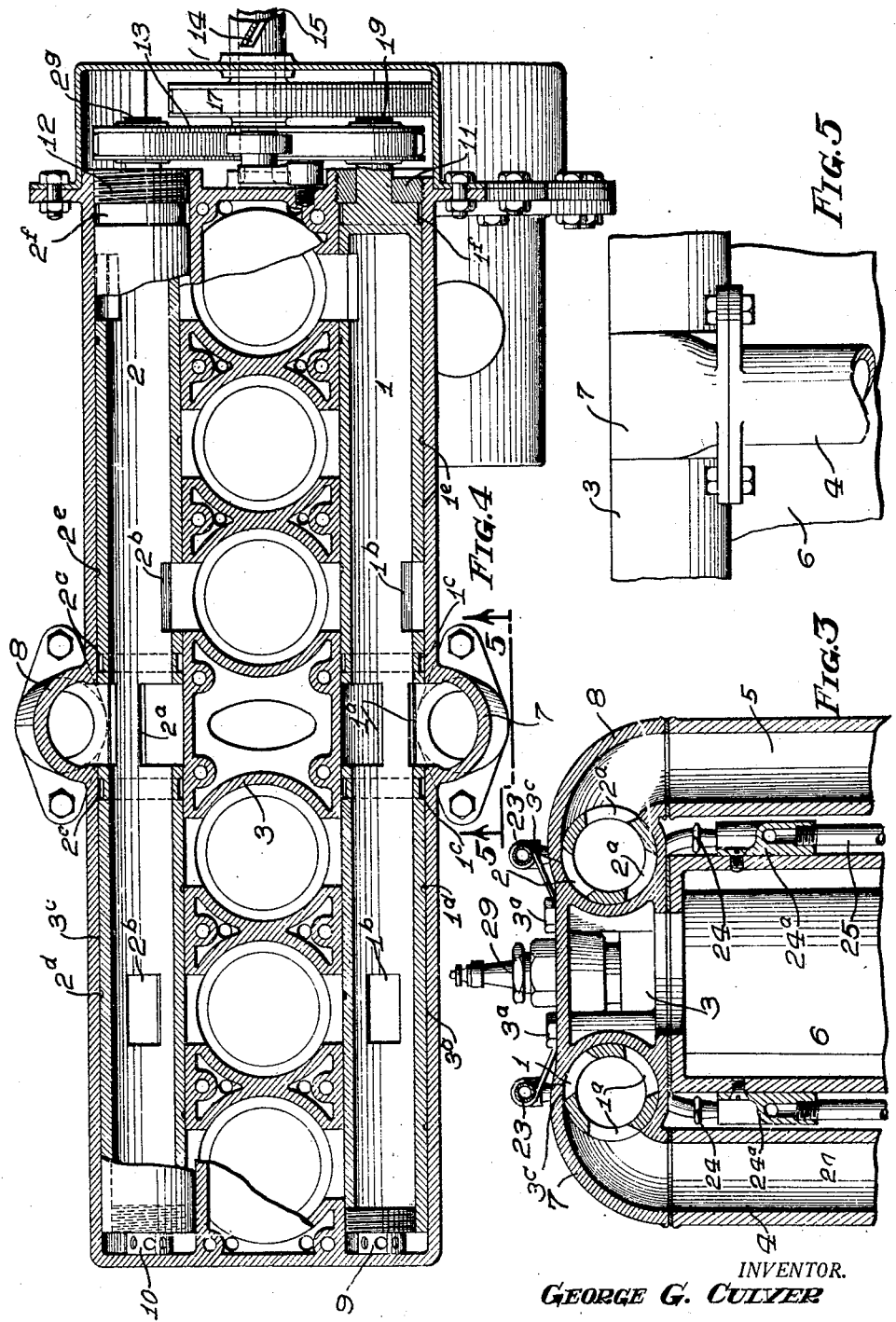

Patented Feb. 24, 1931

1,794,061

UNITED STATES PATENT OFFICE

GEORGE G. CULVER, OF SAN DIEGO, CALIFORNIA

REVOLVING-PORT MOTOR

Application filed November 29, 1926. Serial No. 151,344.

My invention relates to revolving port motors, and the objects of my invention are: first, to provide a motor with a revolving hollow manifold with beveled surface ports; second, to provide a revolving port motor of this class with separate port manifolds for the intake and exhaust; third, to provide a motor of this class with a novel lubricating mechanism in connection therewith; fourth, to provide a motor of this class in which the motor bearings and main parts are lubricated by high pressure and the pressure reduced for the revolving port mechanism and regulated for the sprockets and chains; fifth, to provide a motor of this class in which the fan is operated directly with the gear mechanism; sixth, to provide a motor of this class which is so constructed that the parts are readily accessible for taking out, repairs, replacement and the like; seventh, to provide a motor of this class in which the vibration is reduced to a minimum; eighth, to provide a motor of this class which is very simple and economical of construction, durable, efficient in its action, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a partial longitudinal elevational and sectional view of my motor, shown fragmentarily; Fig. 2 is a sectional view through 2—2 of Fig. 1, showing some of the parts in elevation to facilitate the illustration; Fig. 3 is a sectional view through 3—3 of Fig. 1, showing some of the parts in elevation to facilitate the illustration; Fig. 4 is a cross-section in plan through 4—4 of Fig. 2; Fig. 5 is a fragmentary bottom view on the line 5—5 of Fig. 4, and Fig. 6 is a transverse sectional view through the gear casing through 6—6 of Fig. 1.

Similar characters of reference refer to similar parts and portions throughout the several views of the drawings.

The intake port manifold 1, exhaust port manifold 2, casing 3, intake manifold 4, exhaust manifold 5, cylinder block 6, enlarged portions 7 and 8, thrust plugs 9 and 10, thrust washers 11 and 12, chain 13, fan 14, fan shaft 15, sprockets 16, chain 17, idler 18, crankshaft 19, generator shaft 20, generator shaft sprocket 21, gear casing 22, oil conductors 23, 24, 25, 26 and 27, and the oil pressure regulator valve 28, constitute the principal parts and portions of my revolving port motor.

The cylinder block 6, pistons, crank and crankcase are of the conventional type as are used in connection with the motor. Secured on the upper side of the cylinder block 6 by means of bolts 3a is a casing 3, which extends longitudinally across the cylinder block and extends past the side thereof at the middle, as shown best in Fig. 2 of the drawings. It is provided with a bore 3c in which is revolubly mounted the intake port manifold 1 and is provided on the opposite side with another bore 3c in which is revolubly mounted the exhaust port manifold 2. This casing 3 is provided with a plurality of wells in which are mounted the spark plugs 29. The intake and exhaust port manifolds fit snugly the bores 3b and 3c, and they are hollow so that the fuel and exhaust gases pass through the interior of said manifolds 1 and 2, which are each provided with three ports at their middle portions, the intake ports being indicated as 1a and the exhaust ports being indicated as 2a, as shown best in Fig. 3 of the drawings. It will be noted that these ports 1a and 2a are provided with beveled or inclined walls adapting them for the proper intake and exit of gases from and to the interior of said members 1 and 2. It will also be noted that these ports 1a and 2a are at the middle portion of the engine and said port manifolds and are adapted to communicate with extended portions 7 and 8 of the casing 3, and at the sides the portions 7 connect with the intake manifold 4, which communicates with the carburetor, and the portion 8 connects with the exhaust manifold 5, it being noted that the casing is provided with enlarged portions 7 and 8, which provide channels for the passage of fuel and exhaust gases.

Screwed into the one end of the intake port manifold 1 is a plug 9, which is provided with a drilled head, which serves as an adjustment and thrust member for the port manifold 1. The exhaust port manifold 2 is provided with a similar member 10 for the same purpose.

The intake port manifold is provided with a plurality of intake ports 1b, one for each cylinder of the motor. In this case I have shown six to coincide with a six-cylinder motor, as shown. The exhaust port manifold 2 is also provided with a plurality of similar ports 2b, which coincide with the cylinders in the cylinder block 6. These ports, it will be noted, are timed so that they communicate with the combustion chamber of the engine cylinder at the proper time.

These port manifolds are also each provided with channels 1c and 2c on opposite sides of the ports 1a and 2a, as shown best in Figs. 1 and 4 of the drawings. They are also each provided with spiral channels 1d and 1e and 2d and 2e extending from the end to the channels 1c and 2c, thus providing means for conducting lubricating oil in a spiral manner on the periphery of these port manifolds for thoroughly lubricating said manifolds relative to the casing and conducting oil from the ends to the middle, forming a portion of the oil circulating system.

It will be noted that the purpose of the spiral grooves is to deposit oil on the surface of the casing coming in contact with the outside of the revolving port manifolds, thereby insuring proper lubrication, and that these spirals should be so positioned to force oil longitudinally on the walls of the casing and should be so located on the circumference of said revolving port manifolds that when revolved past the port openings into the combustion chambers of the several cylinders, the piston of said combustion chamber will be traveling from its lowest position to approximately one-half way to the top of the cylinder on the exhaust stroke, thereby not causing loss of compression on the compression stroke nor drawing oil from the groove on the suction stroke.

The intake port manifold is provided with a reduced portion 1f. This and the exhaust port manifold are provided with a reduced portion 2f, which serve as lubricating channels connecting with the ends of the spirals 1e and 2e.

The intake port manifold is provided with a shaft 1g positioned centrally thereon and extending therefrom, and the exhaust port manifold is provided with a similar shaft 2g. Surrounding the shaft 1g is a washer 11, which is externally threaded and adapted to screw into the end of the casing 3, and surrounding the shaft 2g is a washer 12, externally threaded, adapted to fit into the casing 3 at the exhaust manifold side.

These shafts 1g and 2g are provided with silent chain sprockets upon which is mounted the silent chain 13, thus providing means for revolving the members 1 and 2 in the same direction simultaneously and in proper timed relation. The chain is held in certain relation to the sprockets by means of an idler pulley 13a, and the chain 13, which is the silent chain, is operated by means of a sprocket 13b mounted on the shaft 15, which is the fan shaft upon which the fan 14 is mounted. The fan is operated directly by the sprockets 16 and 13b by a slip joint. Mounted on these sprockets 16 and 13b is a silent chain 17, which is mounted on a sprocket 19a on the main driveshaft 19, and the chain is supported in position by means of an idler pulley 18, all as shown best in Fig. 6 of the drawings. This chain 17 also passes around and engages a sprocket 21 on the shaft 20, which shaft 20 is the motor ignition and starting generator shaft.

These sprockets and chains are encased in a casing 22, which, it will be noted, is made in sections divided at 22a so that the sprockets and chains may be readily accessible for repair, replacements and the like.

It will be noted that the casing 3 is provided with water jackets throughout and adjacent to the intake and exhaust port manifolds, which water jackets communicate with the water jackets in the engine block in the conventional manner.

In order to properly lubricate the port manifolds, gearing and the like in connection with the motor proper, there is provided a pair of lubricating members 23 extending longitudinally with the casing 3 and connected together by means of the conductor 23a, as shown best in Fig. 2 of the drawings. These conductors 23 communicate with the opposite ends of the casing 3 at the opposite ends of the port manifolds 1 and 2, conducting oil in the channels 1f and 2f and around the reduced ends of the plugs 9 and 10, and the oil passes through the spirals 1d and 1e, and 2d and 2e, to the oil channels 1c and 2c, then through the conductors 24 to a Y-member 24a, then through the conductor 25 down into the crankcase of the engine. The conductor 27 communicates with the lubricating oil pump at its one end, and is provided with a regulator valve 28 with a branch 26 extending from the regulator valve, and its opposite end is directed toward the gears in the gear case 22 so that the oil is pumped under high pressure to the bearings in the motor, but the valve 28 is adapted to regulate the pressure so that the pressure is lower in the conductor 23b (see Fig. 2 of the drawings), which conductor extends to the conductor 23 at or near the juncture of the connection of the longitudinal conductors with the cross conductor 23a, thus providing means for conducting lubricating oil under high pressure to the bearings in the motor and reducing the pressure to the port manifold, while spraying oil at varying pressure on the sprockets and chains.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a motor, the combination with the motor cylinders and pistons, of a casing provided with bores disposed on opposite sides of said cylinders, hollow intake and exhaust members revolubly mounted therein, ports formed in said intake and exhaust members, intake and exhaust manifolds connecting therewith, means for revolving said intake and exhaust members simultaneously and timed with the motor pistons, continuous spiral oil conducting channels formed in said revoluble members for conducting oil in uninterrupted paths from the end of said intake and exhaust members toward the central portion thereof and in intimate contact therewith, and means for conducting oil to said spiral lubricating channels.

2. In a motor of the class described, the combination with the motor cylinders, of revolving intake and exhaust port manifolds disposed on opposite sides of said cylinders, the ports in said manifolds being progressively offset, means for revolving said manifolds simultaneously in timed relation with said engine pistons, each of said intake and exhaust members being provided with spaced lubricating oil channels intermediate the ends and at the ends, continuous spiral conducting and lubricating channels connecting said oil channels, said spiral channels being offset relative to said ports.

In testimony whereof, I have hereunto set my hand at San Diego, California, this 20th day of November, 1926.

GEORGE G. CULVER.